Patented May 3, 1938

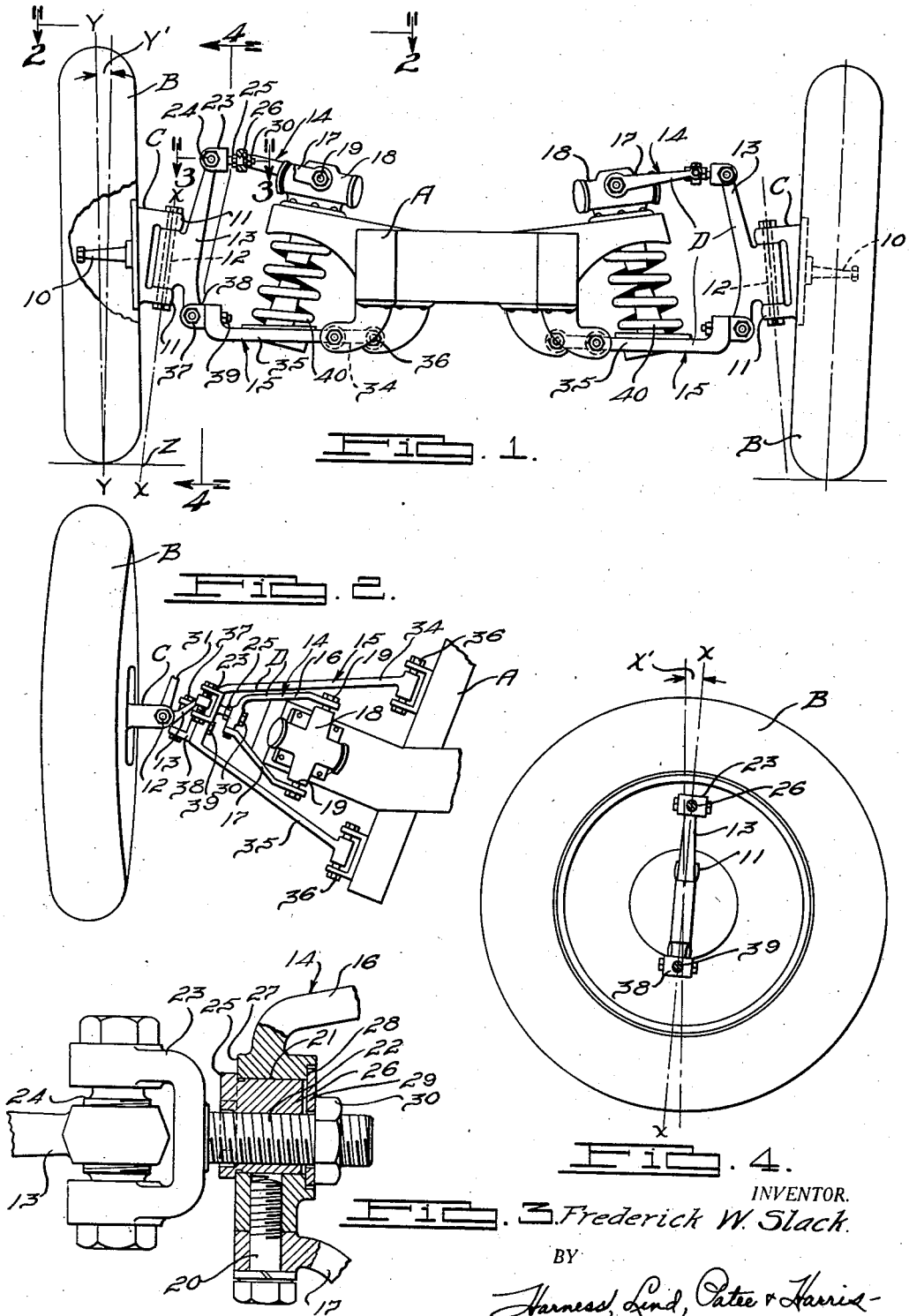

2,115,919

UNITED STATES PATENT OFFICE 2,115,919

VEHICLE WHEEL SUSPENSION

Frederick W. Slack, Detroit, Mich., assignor to Chrysler Corporation, Detroit, Mich., a corporation of Delaware Application August 4, 1934, Serial No. 738,461

19 Claims. (Cl. 280—96.2)

This invention relates to wheel suspensions for vehicles and refers more particularly to so-called independent wheel suspensions for motor vehicles.

In suspensions of the type mentioned above, it is important to provide a predetermined desired wheel alignment and in connection with the steering wheels it is particularly desirable to maintain accuracy in the mounting of such wheels to provide the desired degree of camber and caster. Failure to maintain the aforesaid characteristics may, and often does, result in excessive tire wear, difficult steering, shimmy or tramp of the steering wheels, and other undesirable effects.

In actual production difficulty has been experienced in maintaining the aforesaid characteristics in keeping with practical limitations, cost, workmanship, manufacturing tolerances, and the like.

It is an object of my invention to overcome the aforesaid undesirable effects and difficulties in an improved manner.

A further object of my invention resides in the provision of an improved wheel suspension particularly adapted for manufacture at relatively low cost. A still further object of my invention resides in the provision of an improved wheel suspension capable of manufacture in keeping with ordinary practical limitations of manufacturing tolerances.

A further object of my invention is to provide improved means for adjusting a vehicle steering wheel for caster or camber or both without requiring disassembly of the suspension and also to provide a single or common adjusting means for a plurality of wheel geometry characteristics such as caster and camber.

In carrying out the objects of my invention, I preferably provide suitable means in the wheel suspension mechanism for conveniently and accurately compensating for any inaccuracies introduced in the manufacture and assembly of parts thereof. Thus, by reason of my novel compensating means, any inaccuracies in wheel camber and caster may be readily corrected. Futher objects and advantages of my invention will be apparent from the following detailed description of my invention, reference being had to the accompanying drawing in which I have shown one form which my invention may assume by way of example and illustration.

In the drawing in which like reference characters represent corresponding parts throughout the several views, Fig. 1 is a front elevational view of the forward vehicle steering wheels showing my improved suspension mechanism therefor.

Fig. 2 is a top plan view of my wheel suspension, the view being taken as indicated by the line 2—2 of Fig. 1.

Fig. 3 is a detail sectional view of the upper connector illustrating my adjusting means, the section being taken along the line 3—3 of Fig. 1.

Fig. 4 is a sectional elevational view through the line 4—4 of Fig. 1.

In the drawing, reference character A represents the frame or load carrying structure of the motor vehicle, the body, engine, and driving parts of the motor vehicle being omitted for clarity in my disclosure since such parts are well known in the art and may be of any desired form and arrangement.

I have illustrated my invention in connection with the forward steering ground wheels B of the motor vehicle, each wheel being journalled on a spindle 10 of the wheel supporting means C. This wheel supporting means of each of the wheels B is also preferably formed with bearings 11 for receiving a king-pin 12 providing swiveling of the steering wheel about the axis X—X of the king-pin or steering knuckle pivot.

As the parts associated with each of the wheels B are similar, the description for the most part will be limited to one of the wheels and parts associated therewith.

The wheels B in their normal positions illustrated in Fig. 1 are preferably cambered so that the plane Y—Y of each wheel extends upwardly and outwardly at an inclination to the vertical, the camber angle being designated at Y' in Fig. 1. The desirability of camber for steering wheels is generally accepted and understood and when axis X—X lies along the intersection of plane Y—Y with the ground, then the traction resistance of the wheel has no effective lever arm. It is therefore generally desirable to arrange the king-pin so that its axis X—X intersects the ground a small distance inside plane Y—Y as represented by the point Z in Fig. 1, in order to provide a lever arm tending to restore the wheel to its straightahead position.

The desirability of castor is also well understood and in Fig. 4 the caster angle is designated as X', this being the angle between the king-pin axis X—X and the vertical.

In order to support the frame structure A by the wheels B and to provide substantially independent suspension or springing movement of each of the wheels relative to the other, I have provided the connecting means D intermediate the frame and the wheel supporting means C. This connecting means includes an arm or steering knuckle bracket 13 associated with each of the wheels B, each arm being adapted to support or carry a king-pin 12 by reason of the bearing portion thereof which lies between the spaced bearings 11.

Arm 13 extends generally vertically in the sense that the ends thereof are positioned in spaced relation, the connecting means D in the illustrated embodiment of my invention being arranged in a substantially trapezoidal shape. Thus, during a displacement of the wheel, the track between wheels B remains practically unchanged when either wheel strikes a depression or encounters a bump in the roadway. The linkage or connecting means D, while of the general parallelogram type, is preferably arranged in the form of a rectangle and more particularly in the form of a trapezoid defined by various supports for the linkage parts. Extending generally laterally or transversely of the vehicle are the upper and lower linkages or connectors 14 and 15 respectively, these connectors being of the so-called wishbone type or generally V-shaped. Where the aforesaid trapezoidal arrangement of linkage is desired, connector 15 is somewhat longer than connector 14 as illustrated, this arrangement deviating somewhat from a true parallelogram but providing substantially vertically guided movement of the point of wheel tread contact with the ground on displacement of the wheel.

Connector 14 has its arms 16 and 17 thereof diverging toward frame A for pivotal connection therewith. With this in view the frame structure A may rigidly support a shock absorber 18 of any suitable type having an oscillating actuating shaft or pivot pin 19 to which the inner ends of arms 16 and 17 are connected. Thus, shaft 19 forms the pivotal support for the arms of connector 14 and, if desired, such shaft may be supported directly by the frame structure. The shock absorber, in effect, constitutes a frame bracket for the pivot pin 19.

For convenience of manufacture and assembly, arm 16 may be assembled to arm 17 by fastener 20, the resulting wishbone providing a rigid linkage. At the outer end of connector 14 substantially at the intersection of arms 16 and 17, the connector is formed with a cylindrical opening 21 therethrough receiving in spaced eccentric relationship the inwardly extending threaded shank or stem 22 of the adjustable connector member 23 which projects outwardly and inwardly from the connector 14. This adjustable member is outwardly forked to receive the threaded pin 24 which lies transversely with respect to the stem 22. This pin 24 pivotally supports the upper end of arm 13 between the forks of the adjustable member 23.

Threaded on the stem 22 is an eccentric headed bushing member formed with the head or nut portion 25 and the inwardly extended eccentric bushing portion 26. The eccentric bushing 26 fills the space between opening 21 and stem 22 and the nut 25 bears against the outer flat face 27 of the connector 14. The weight of the vehicle normally acts through the suspension linkage to urge the stem 22 inwardly and to thereby urge the nut 25 against the face 27. Bearing against the inner flat face 28 of connector 14 is an eccentric washer 29 and lock nut 30 concentrically threaded on the inwardly projecting end of stem 22.

The steering wheels B are rotated about their respective king-pins 12 to effect steering of the vehicle in any well-known manner, a portion of one of the steering arms 31 being shown in Fig. 2. By reason of the pivot pins 19 and 24, the connector 14 may pivotally swing with respect to frame A and arm 13 in guiding the wheel when displacement thereof occurs.

Connector 15 is illustrated as the wishbone type generally similar in form to the upper connector 14. Thus, the lower connector 15 is likewise formed with arms 34 and 35 which, although somewhat longer than the corresponding arms 16 and 17 of connector 14, diverge toward the frame A in generally similar manner for pivotal connection therewith by reason of the pivot pins 36. The connector 15 may be likewise provided with an adjustable forked member similar to the Fig. 3 arrangement, although in my drawing I have shown the lower end of arm 13 pivoted to a pin 37 carried in a bracket 38 secured to the lower connector 15 by an adjustable bolt and pin assembly 39 which extends at right angles to pin 37. Connectors or linkages 14 and 15 cooperate with arm 13 to impart the desired guided movement to the wheel on displacement thereof.

The vehicle frame structure A and the load carried thereby is yieldingly supported by the wheel supporting means C and connecting means D by reason of suitable springs illustrated at 40 intermediate the frame structure and lower connector 15. If desired, other forms of connectors and springing means may be provided and it is not my intention to limit my invention in its broader aspects to the particular form and arrangement of parts shown herein for purposes of illustration.

From the foregoing reference to the desirable characteristics of wheel geometry it follows that, prior to the teachings of my invention, it would be necessary to maintain at undesirably high cost an unusually high degree of machining tolerances and skill in assembly and general workmanship if these desirable characteristics are to be obtained with the desired degree of precision in the production of motor vehicles. These objectionable factors are most pronounced in the so-called independently sprung wheels to which class my invention particularly relates. My invention will compensate for any inaccuracies in the various parts of the linkage forming the wheel suspension mechanism in an improved manner.

In overcoming the aforesaid difficulties, inconveniences, and expenses, I have provided means for adjusting the normal position of any ground wheel whereby to conveniently and accurately compensate for errors introduced during the manufacture and assembly processes, as well as during the life of the motor vehicle from a service adjustment standpoint.

My adjusting means is furthermore operable after assembly of the wheel suspension and without requiring disassembly of the parts, jacking the car up, or other operations beyond the manipulation of the adjusting means.

In operation of the adjusting means, the lock nut 30 is backed a few turns away from the eccentric washer 29 and the nut 25 is then rotated in one direction or the other depending on the character of adjustment desired. Where it is desired, for example, to increase the camber angle Y' it will be apparent that the nut 25 is rotated to thread the stem 22 outwardly and thereby swing the upper end of the arm 13 outwardly or away from the frame structure A. A reverse rotative adjustment of the nut 25 will, of course, decrease the camber angle Y'.

During the adjustment of the camber angle Y' it will be apparent that the stem 22 will be carried up and down and back and forth within the cylindrical opening 21 and when the desired camber angle has been obtained, a final adjustment of the nut 25 for only a portion of a turn thereof will move the stem 22 and upper end of arm 13 forwardly or rearwardly to obtain the desired caster angle X'. It will be apparent that where the camber angle does not need adjustment and where it is desired to effect an adjustment of the caster angle X' only, the nut 25 is only slightly rotated sufficiently to swing the upper end of arm 13 about the pivot pin 39 a distance sufficient to adjust the king-pin axis X—X as may be desired. However, where the camber angle Y' is to be adjusted it will ordinarily be necessary to rotate the nut 25 one or more complete revolutions followed by the aforesaid fractional rotation of nut 25 to set the caster angle X' as the final part of the adjustment.

After the wheel suspension mechanism has been adjusted as desired, the nut 30 is brought tightly against the washer 29 to rigidly connect the adjustable member 23 with the connector 14 and thereby securely lock the adjusting means against accidental displacement.

I desire to point out that various modifications and changes will be apparent from the teachings of my invention and I do not limit my invention in its broader aspects to the particular combination and arrangement of parts which I have shown by way of illustrating the principles of my invention.

What I claim is:

1. In a suspension for a steering ground wheel of a motor vehicle having a frame structure, wheel supporting means including a substantially vertically extending arm, upper and lower linkages intermediate said frame structure and said arm, an adjustable connector between said arm and one of said linkages, said connector having a threaded stem, and a headed eccentric bushing threaded on said stem and engaging the last said linkage and adapted to adjust said stem laterally and longitudinally of its axis to vary the wheel caster and camber.

2. In a suspension for a ground wheel of a motor vehicle having a frame structure, wheel supporting means including a knuckle bracket, link means intermediate said frame structure and one end of said knuckle bracket for guiding displacement of said wheel, a connector member between said knuckle bracket end and said link means, said connector member having a stem, and rotatable means threaded on said stem and adapted on rotation thereof to adjust said stem in its axial direction to vary the wheel camber, said rotatable means having an eccentric bushing portion intermediate said stem and said link means for varying the wheel caster.

3. In a suspension for a ground wheel of a motor vehicle having a frame structure, wheel supporting means including a knuckle bracket, link means intermediate said frame structure and one end of said knuckle bracket for guiding displacement of said wheel, a connector member between said kunckle bracket end and said link means, said connector member having a stem, and a nut threaded on said stem between said knuckle bracket end and said link means and adapted on rotation thereof to adjust said stem in its axial direction to vary the wheel camber, said nut having a bushing portion eccentrically journalling said stem in said link means for varying the wheel caster.

4. In a suspension for a ground wheel of a motor vehicle having a frame structure, wheel supporting means including a knuckle bracket, link means intermediate said frame structure and one end of said knuckle bracket for guiding displacement of said wheel, a connector member between said knuckle bracket end and said link means, said connector member having a stem, rotatable means threaded on said stem and adapted on rotation thereof to adjust said stem in its axial direction to vary the wheel camber, said rotatable means having an eccentric bushing portion intermediate said stem and said link means for varying the wheel caster, and locking means for said stem and link means.

5. In a suspension for a ground wheel of a motor vehicle having a frame structure, wheel supporting means including a knuckle bracket, link means intermediate said frame structure and one end of said knuckle bracket for guiding displacement of said wheel, a connector member between said knuckle bracket end and said link means, said connector member having a stem, a nut threaded on said stem between said knuckle bracket end and said link means and adapted on rotation thereof to adjust said stem in its axial direction to vary the wheel camber, said nut having a bushing portion eccentrically journalling said stem in said link means for varying the wheel caster, and a second nut concentrically threaded on said stem for locking said stem to said link means.

6. In a suspension for a ground wheel of a motor vehicle having a frame structure, wheel supporting means including a knuckle bracket, link means intermediate said frame structure and one end of said knuckle bracket for guiding displacement of said wheel, a connector member between said knuckle bracket end and said link means, said connector member having a stem, a nut threaded on said stem between said knuckle bracket end and said link means and adapted on rotation thereof to adjust said stem in its axial direction to vary the wheel camber, said nut having a bushing portion eccentrically journalling said stem in said link means for varying the wheel caster, an eccentric washer engaging said link means between said frame structure and said bushing portion, and a second nut concentrically threaded on said stem and engaging said washer for locking said stem to said link means.

7. In a suspension for a steering ground wheel of a motor vehicle having a frame structure, wheel supporting means including a substantially vertically extending arm, upper and lower linkages intermediate said frame structure and said arm, an adjustable connector between said arm and one of said linkages, said connector having a threaded stem, and a headed eccentric bushing threaded on said stem and engaging the last said linkage and adapted to adjust said stem laterally and longitudinally of its axis to vary the wheel caster and camber, the wheel suspension being so arranged that the stem is normally urged toward the last said linkage.

8. In a vehicle wheel suspension, wheel supporting means including a knuckle bracket, wheel displacement guiding means including an element having an opening, wheel adjusting means between said bracket and said guiding means and including a member spaced eccentrically within said opening, and a headed member threaded on said member and having an eccentric bushing portion positioned in the space between said opening and said member.

9. In a vehicle wheel suspension, wheel supporting means including a knuckle bracket, wheel displacement guiding means including an element having an opening, wheel adjusting means between said bracket and said guiding means and including a member spaced eccentrically within said opening, and a headed member threaded on said member and having an eccentric bushing portion positioned in the space between said opening and said member, said eccentric bushing portion being threaded on said member and rotatable in said opening.

10. In a suspension for a wheel of a motor vehicle having a frame, wheel supporting means including a wheel supporting spindle and a knuckle bracket swivelled therewith, upper and lower connectors pivoted inwardly to said frame and adapted to pivotally guide said knuckle bracket for vertical displacement of said wheel, one of said connectors having an opening extending generally transversely to the plane of the wheel, an adjustable bracket having its outer end pivotally connected to one end of said knuckle bracket and having its inner end extending through said opening and spaced eccentrically therein, and an eccentric bushing threaded on said adjustable bracket and fitting said opening and adapted on rotation thereof to adjust said adjustable bracket axially and transversely of said opening.

11. In a suspension for a wheel of a motor vehicle having a frame, wheel supporting means including a wheel supporting spindle and a knuckle bracket swivelled therewith, upper and lower connectors pivoted inwardly to said frame and adapted to pivotally guide said knuckle bracket for vertical displacement of said wheel, one of said connectors having an opening extending generally transversely to the plane of the wheel, an adjustable bracket having its outer end pivotally connected to one end of said knuckle bracket and having its inner end extending through said opening and spaced eccentrically therein, and an eccentric bushing threaded on said adjustable bracket and fitting said opening and adapted on rotation thereof to adjust said adjustable bracket axially and transversely of said opening, the last said connector having an outer face adjacent said opening, said bushing having a headed portion positioned outwardly of said opening and engaging said outer face.

12. In a suspension for a wheel of a motor vehicle having a frame, wheel supporting means including a wheel supporting spindle and a knuckle bracket swivelled therewith, upper and lower connectors pivoted inwardly to said frame and adapted to pivotally guide said knuckle bracket for vertical displacement of said wheel, one of said connectors having an opening extending generally transversely to the plane of the wheel, an adjustable bracket having its outer end pivotally connected to one end of said knuckle bracket and having its inner end extending through said opening and spaced eccentrically therein, an eccentric bushing threaded on said adjustable bracket and fitting said opening and adapted on rotation thereof to adjust said adjustable bracket axially and transversely of said opening, the last said connector having an outer face adjacent said opening, said bushing having a headed portion positioned outwardly of said opening and engaging said outer face, and locking means for said adjustable bracket.

13. In a suspension for a wheel of a motor vehicle having a frame, wheel supporting means including a wheel supporting spindle and a knuckle bracket swivelled therewith, upper and lower connectors pivoted inwardly to said frame and adapted to pivotally guide said knuckle bracket for vertical displacement of said wheel, one of said connectors having an opening extending generally transversely to the plane of the wheel, an adjustable bracket having a forked outer end pivotally connected to one end of said knuckle bracket and having an inwardly extending threaded stem projecting eccentrically through said opening, and an eccentric bushing threaded on said stem and slidably fitting within said opening, said bushing having a nut portion for rotating said bushing to simultaneously adjust said stem in the direction of its axis and transversely thereto.

14. In a suspension for a steering ground wheel of a motor vehicle, wheel supporting means, wheel displacement guiding means, and means including an element manually adjustable for simultaneously adjusting the caster and camber of the wheel.

15. In a suspension of the independent type for a steerable ground wheel of a motor vehicle having a frame structure, wheel supporting and guiding means for swingingly connecting said steerable wheel to said frame structure and including a pair of members, one of said members having an opening, the other of said members having a threaded portion disposed in said opening, and an eccentric bushing fitting within said opening and being internally threaded to receive said threaded portion of said other member, said bushing when rotatably adjusted providing for relative displacement of said members to vary the normal position of said steerable wheel with respect to said frame structure, said supporting and guiding means including means for swingingly connecting one of said members to said frame structure.

16. In a wheel suspension according to claim 15, wherein said eccentric bushing is provided with an enlarged headed end portion engageable with a face of said one member adjacent said opening thereof.

17. In a suspension for a steerable ground wheel of a motor vehicle, wheel supporting means, means for guiding rising and falling movements of said wheel supporting means and said wheel independently of the remaining ground wheels of the vehicle, and means including a single adjustable element operably associated with at least one of the first two said means and adapted to vary the caster and camber of said wheel in response to manual adjustment of said element.

18. In an independent suspension for a steerable ground wheel of a motor vehicle, a substantially upright knuckle bracket arm, a plurality of link means respectively articulated between the frame of the vehicle and the upper and lower ends of said arm, and an adjustable element operably associated with said suspension for displacing one end of said arm transversely and longitudinally of the vehicle relative to the link means articulated to such arm end to vary the camber and caster of the wheel.

19. In a suspension for a steerable ground wheel of a motor vehicle, wheel supporting means, means for guiding rising and falling movements of said wheel supporting means and said wheel independently of the remaining ground wheels of the vehicle, and means including a rotatable eccentric bushing operably associated with at least one of the first two said means and adapted on rotation of said bushing to vary the caster and camber of said wheel.

FREDERICK W. SLACK.